US007013684B2

(12) United States Patent
Hooks, Jr.

(10) Patent No.: US 7,013,684 B2
(45) Date of Patent: Mar. 21, 2006

(54) CABLE LOCK COUPLING AND LOCK SYSTEM FOR SURFBOARDS

(75) Inventor: C. Dock Hooks, Jr., Emerald Isle, NC (US)

(73) Assignee: Docks Locks, LLC, Atlantic Beach, NC (US)

( * ) Notice: Subject to any disclaimer, the term of this patent is extended or adjusted under 35 U.S.C. 154(b) by 0 days.

(21) Appl. No.: 11/051,519

(22) Filed: Feb. 4, 2005

(65) Prior Publication Data

US 2006/0032275 A1   Feb. 16, 2006

Related U.S. Application Data

(63) Continuation-in-part of application No. 10/917,099, filed on Aug. 12, 2004, now abandoned.

(51) Int. Cl.
*E05B 73/00* (2006.01)

(52) U.S. Cl. .................. 70/14; 24/598.5; 24/601.5; 70/18; 70/58; 294/89; 441/75

(58) Field of Classification Search ............... 70/14, 70/15, 18, 19, 58, 16, 17; 441/74, 75; 294/89, 294/90, 103.1; 24/598.5, 537, 515, 601.5, 24/905; 292/283, 284, 298; 280/507; 403/321, 403/325, 322.1; 59/95

See application file for complete search history.

(56) References Cited

U.S. PATENT DOCUMENTS

| | | | | |
|---|---|---|---|---|
| 227,793 | A * | 5/1880 | Kingston | 24/598.5 |
| 1,132,486 | A * | 3/1915 | Oster | 70/260 |
| 1,262,974 | A * | 4/1918 | Pearen | 24/598.5 |
| 1,299,821 | A * | 4/1919 | Carpmill et al. | 24/598.5 |
| 4,680,949 | A * | 7/1987 | Stewart | 70/14 |
| 4,938,040 | A | 7/1990 | Humphreys | 70/58 |
| 5,119,649 | A | 6/1992 | Spence | 70/14 |
| 5,430,914 | A * | 7/1995 | Patterson et al. | 24/598.5 |
| 5,467,617 | A * | 11/1995 | Huebner | 70/18 |
| 5,502,989 | A * | 4/1996 | Murray et al. | 70/58 |
| 5,832,754 | A | 11/1998 | McKenzie | 70/58 |
| 5,867,877 | A * | 2/1999 | Patterson et al. | 24/598.5 |
| 6,257,029 | B1 * | 7/2001 | Liao | 70/58 |
| 6,360,408 | B1 * | 3/2002 | Dykstra et al. | 24/598.7 |
| 6,602,015 | B1 * | 8/2003 | Evans et al. | 403/109.1 |
| 6,880,373 | B1 * | 4/2005 | Ling | 70/58 |

* cited by examiner

*Primary Examiner*—Lloyd A. Gall
(74) *Attorney, Agent, or Firm*—Peter J. Van Bergen (57) ABSTRACT

A cable lock coupling is part of a surfboard locking system. The coupling includes a housing, a pin, a ring and jaws. The pin is slidably fitted in the housing and is movable between a first position and a second position. The ring is coupled to a first end of the pin, is sized/shaped to slidably fit only in a first portion of the housing, and is able to receive a cable lock's cable therethrough when it substantially protrudes from the housing when the pin is in the first position. The jaws, coupled to a second end of the pin, are free to open when the pin is in the second position, and are forced to close when the pin is in the first position. The cable portion of a cable lock is passed through the ring protruding from the housing when the pin is in the first position.

32 Claims, 6 Drawing Sheets

CABLE LOCK COUPLING AND LOCK SYSTEM FOR SURFBOARDS

This is a continuation-in-part of application Ser. No. 10/917,099, filed Aug. 12, 2004, now abandoned. Pursuant to 35 U.S.C. §120, the benefit of priority from co-pending application Ser. No. 10/917,099 is hereby claimed for this application.

FIELD OF THE INVENTION

The invention relates generally to surfboard security systems, and more particularly to a system for coupling a cable lock to a surfboard.

BACKGROUND OF THE INVENTION

Ideally, a good surfboard security system will (i) provide for the secure locking of a surfboard without requiring modification of the surfboard, (ii) be easily adapted to simultaneously lock multiple surfboards to one another, (iii) be simple to use, and (iv) be able to utilize state-of-the-art lock technology to avoid the costs associated with specialized lock mechanism development. Unfortunately, current surfboard security systems are unable to achieve all of these goals at the same time.

SUMMARY OF THE INVENTION

Accordingly, it is an object of the present invention to provide a cable lock coupling system and surfboard locking system that uses the coupling system.

Another object of the present invention is to provide a cable lock coupling that can be used with any standard cable lock in order to form a surfboard locking system.

Still another object of the present invention is to provide a cable lock coupling that can be used in multiples thereof along with any standard cable lock in order to form a surfboard locking system that can lock multiple surfboards simultaneously.

Other objects and advantages of the present invention will become more obvious hereinafter in the specification and drawings.

In accordance with the present invention, a surfboard locking system includes a coupling and a cable lock. The coupling includes a housing, a pin, a ring and jaws. The housing has a passage extending therethrough that is defined by first and second adjacent portions. The pin, slidably fitted within the passage, has first and second ends. At least one of the first end and second end is in the housing at all times. The pin is movable between a first position and a second position. Specifically, the second end is within the housing when the pin is in the first position and the second end protrudes from the housing when the pin is in the second position. The ring is coupled to the first end of the pin. The ring is sized and shaped to slidably fit only in the first portion of the passage, and is further able to receive a cable (of a cable lock) therethrough when the pin is in the first position and prevents receipt of the cable therethrough when the pin is in the second position. Jaws, coupled to the second end of the pin, are free to open when the pin is in the second position, and are forced to close when the pin is in the first position. When open, the jaws can be disposed on either side of a rod fixably mounted within the leash plug of a surfboard. Then, when closed with the pin in the first position, the jaws capture the rod therebetween and the housing keeps the jaws closed and locked about the rod. The cable portion of a cable lock is passed through the ring since the ring at least partially protrudes from the housing when the pin is in the first position. The cable essentially locks the housing in place so that the jaws are kept closed and locked about the leash plug's rod.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
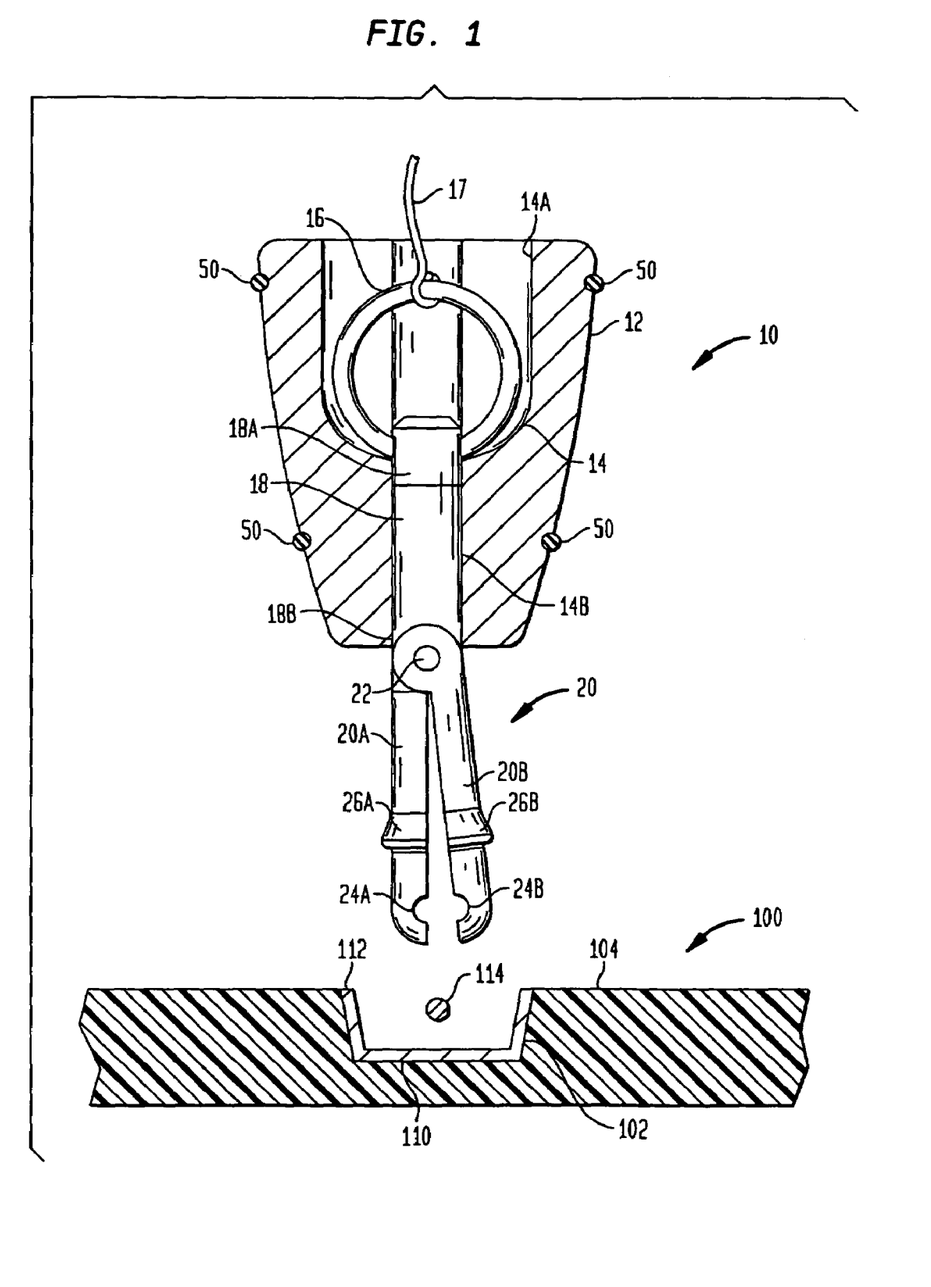
FIG. 1 is a part cross-sectional, part side view of an embodiment of a cable lock coupling according to the present invention in which the coupling's jaws are shown open prior to engagement with the rod portion of a surfboard's leash plug illustrated in a cross-sectional view.

Referring now to the drawings, and more particularly to FIG. 1, an embodiment of a cable lock coupling system of the present invention is shown and is referenced generally by numeral 10. System 10 is illustrated prior to its engagement of a surfboard's leash plug 110 embedded in a conventional surfboard 100. As is well known in the art, each plug 110 is fixed within a hole 102 in surfboard 100 and is flush with a surface 104 thereof. Leash plug 110 is essentially a cylindrical cup 112 supporting a rod 114 that extends diametrically across cup 112. A leash cord (not shown) is typically looped around or tied to rod 114.

Cable lock coupling system 10 includes an exterior housing 12 made from a strong, rigid material (e.g., metal, composite, plastic, etc.). Housing 12 can be constructed from solid material or can be a hollow shell type of construction. In either case, a passage 14 extends all the way through housing 12. Passage 14 is divided into two adjacent portions 14A and 14B with, in general, passage 14A being larger than passage 14B. More specifically, passage 14A must be sized and shaped to permit sliding engagement with both a ring 16 and a pin 18, while passage 14B is sized and shaped to only permit sliding engagement with pin 18.

Pin 18 is defined by first and second ends 18A and 18B, respectively. As will be apparent from the ensuing description, at any given time during the use of cable lock coupling system 10, one or both of ends 18A and 18B will reside within housing 12. Pin 18 is typically a solid cylindrical pin made from a strong, rigid material (e.g., metal, composite, plastic, etc.). However, it is to be understood that pin 18 could also be hollow and have a non-cylindrical external geometry without departing from the scope of the present invention. For example, the external geometry of pin 18 could be indexed to the geometry of passage 14B in order to prevent rotation of pin 18 about its longitudinal axis.

Coupled to end 18A of pin 18 is ring 16 which can be a circular ring as shown. In general, ring 16 is sized/shaped to receive one end and the cable portion of a cable lock as will be explained further below. Accordingly, it is to be understood that the particular size and shape of ring 16 are not limitations of the present invention. Ring 16 can be rigidly coupled to or made integral with end 18A, or can be passed through end 18A such that ring 16 can pivot about its mounting position. Still further, end 18A with ring 16 coupled thereto could be coupled to the remainder of pin 18 by a swivel coupling (not shown) to allow ring 16 to spin about the longitudinal axis of pin 18 when ring 16 is not captured within housing 12.

Coupled to end 18B of pin 18 is a set of jaws 20 that, when end 18B protrudes from housing 12, is free to open as shown. In general, jaws 20 have first and second jaw members 20A and 20B pivotally coupled to one another at a pivot 22 located at end 18B. Jaw members 20A and 20B are sized and shaped such that, when closed together, they will slidingly fit within passage 14B. For strength and rigidity, jaw members 20A and 20B can be of solid construction. In the illustrated embodiment, jaw member 20A is fixedly coupled to or made integral with pin 18 whereas jaw member 20B is pivotally coupled to end 18B by pivot 22. Jaw members 20A and 20B can be (but need not be) biased into the open position (as shown) by means of a spring (not shown) mounted in any one of a variety of places (e.g., at pivot 22, between jaw members 20A and 20B, etc.) as would be understood by one of ordinary skill in the art.

Jaw members 20A and 20B define respective U-shaped portions 24A and 24B near the outboard ends thereof. U-shaped portions 24A and 24B oppose one another such that, when jaws 20 are closed, U-shaped portions 24A and 24B join to form a tubular passage 24 (FIG. 3) that will encircle rod 114 as will be explained further below.

Coupled to or integral with jaw members 20A and 20B are respective opposing flanges 26A and 26B. When jaws 20 are closed, opposing flanges 26A and 26B meet to define an annular flange 26 (FIG. 3). Annular flange 26 serves two purposes. First, annular flange 26 serves as a stop that defines how far pin 18 can travel when ring 16 is pulled out of housing 12. Second, the position of annular flange 26 over leash plug 110 (FIG. 2) serves as an impediment to tampering with the portion of jaws 20 that is closed and locked about rod 114.

With additional reference now to FIGS. 2 and 3, use of cable lock coupling system 10 as part of a surfboard locking system will be explained. With system 10 shown as illustrated in FIG. 1, open jaws 20 can be placed about rod 114 of leash plug 110. Housing 12 is moved towards surfboard 100 to close jaws 20 so that jaw members 20A and 20B capture rod 114 therebetween at respective U-shaped portions 24A and 24B.

The relative movement between housing 12 and pin 18 can be accomplished in a variety of ways without departing from the scope of the present invention. For example, a user could simply push housing 12 towards surfboard 100 thereby causing the outboard ends of jaws 20 to contact the bottom of cup 112 whereby housing 12 continues to move and lock about jaws 20. Additionally or alternatively, a lanyard 17 can be tied to ring 16 such that lanyard 17 is always accessible. In this way, once system 10 is in place, a user holds housing 12 and pulls on lanyard 17 to create the relative locking movement. Another option is to size the components of system 10 such that when ring 16 "bottoms out" in passage 14A, a small portion of ring 16 (i.e., enough to grasp but not enough for a lock cable to be passed therethrough) protrudes from housing 12 so that a user can still grasp ring 16 when end 18B protrudes from housing 12.

Figure 2:
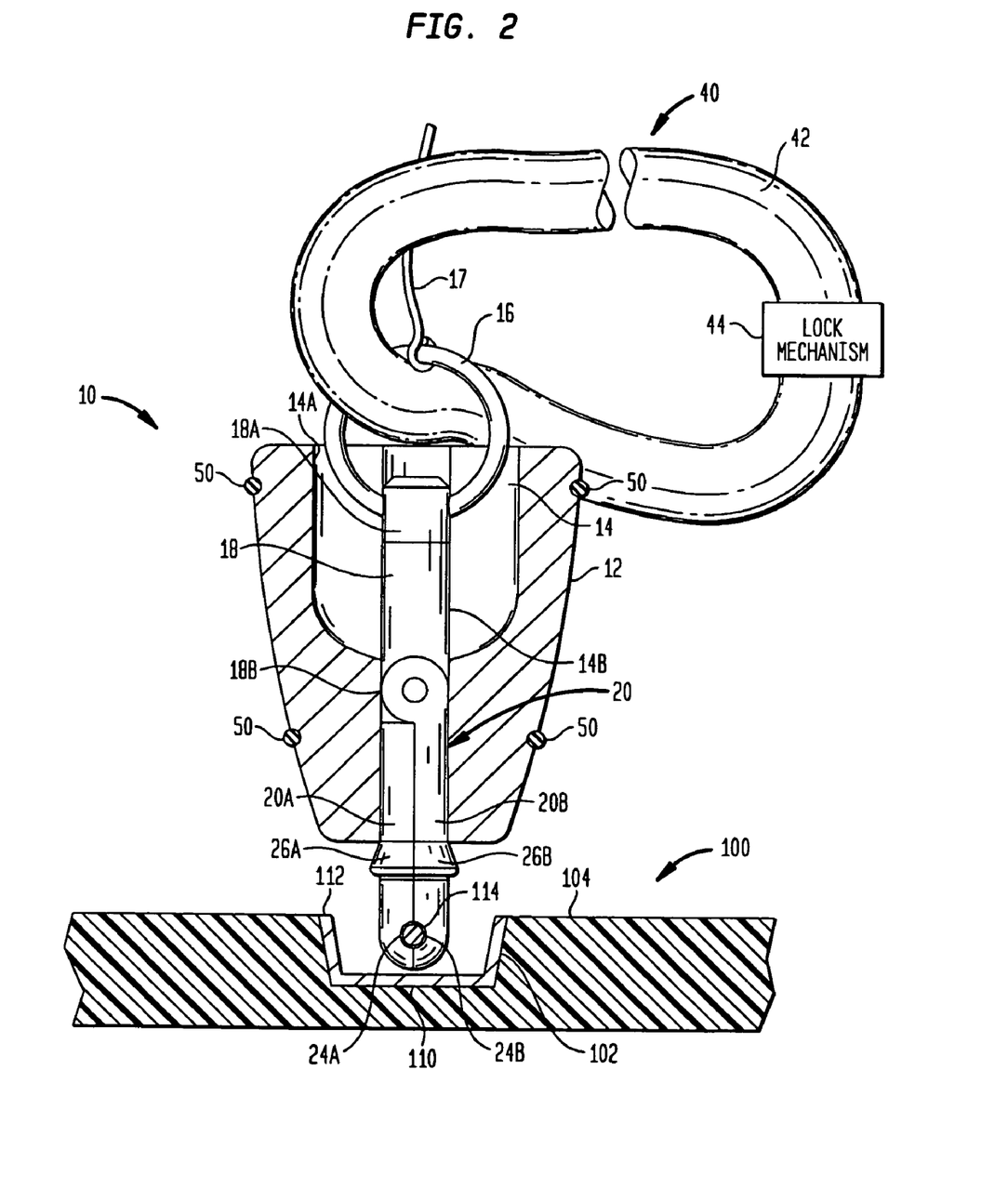
FIG. 2 is a part cross-sectional, part side view of the cable lock coupling of FIG. 1 after it has engaged the leash plug's rod and been locked thereto by the cable portion of a cable lock that passes through the cable lock coupling's ring.
Figure 3:
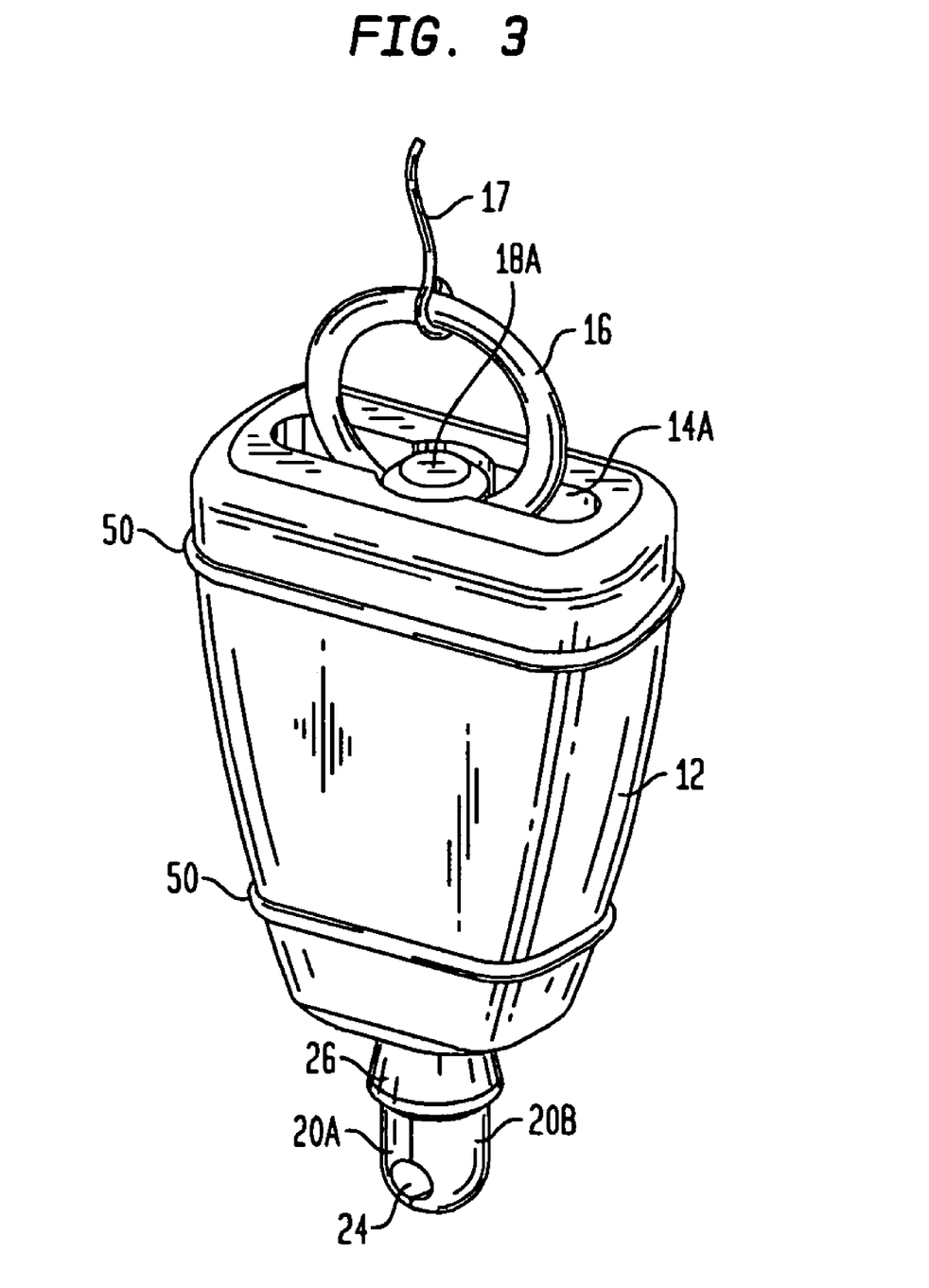
FIG. 3 is an isolated perspective view of the cable lock coupling with its jaws closed and locked by the coupling's housing.

Once jaws 20 are closed (with rod 114 captured therebetween) and locked together as shown in FIG. 2, most or all of ring 16 protrudes from housing 12. A conventional cable lock 40 (e.g., defined by a cable 42 and a lock mechanism 44 for coupling two ends of cable 42 to one another) cooperates with system 10 to create a secure surfboard locking system. More specifically, with cable lock 40 in its unlocked state (e.g., one end of cable 42 is uncoupled from lock mechanism 44), cable 42 is threaded through ring 16 and looped around a desired fixed location (e.g., car rack, fence, pole, etc.). The free end of cable 42 is then coupled to lock mechanism 44. With cable 42 passed through ring 16, housing 12 essentially locks jaws 20 in the closed position with U-shaped portions 24A and 24B encircling rod 114.

The advantages of the present invention are numerous. The cable lock coupling provides a simple and secure way to lock up a surfboard. No modifications to the surfboard are required. The coupling will work with any of a variety of conventional cable locks and can, therefore, be easily and readily updated with the current state-of-the-art lock technology. Furthermore, the locking of multiple surfboards is easily accommodated as each surfboard only requires the cable lock coupling of the present invention. That is, one conventional cable lock can be used to thread through the rings of multiple couplings. Thus, the need for multiple locks, keys, combinations, etc., is eliminated.

The present invention is not limited to the embodiment described above. For example, housing 12 could be encased in a cushioning material (e.g., rubber) to protect the surfboard to which it is attached. Another option shown in FIGS. 1–3 is to provide one or more cushioning elements 50 about the periphery of housing 12.

Figure 4:
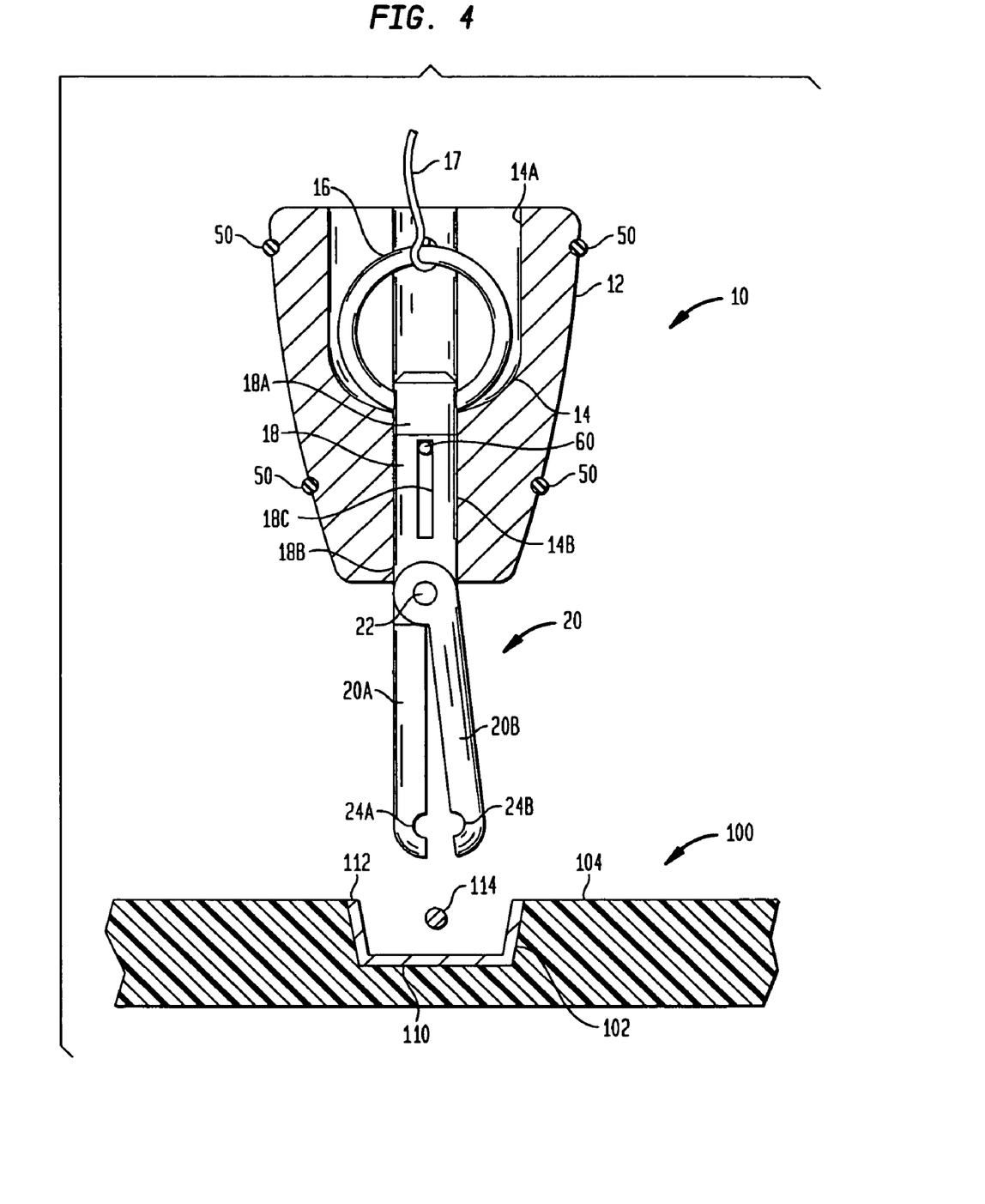
FIG. 4 is a part cross-sectional, part side view of another embodiment of a cable lock coupling according to the present invention in which the coupling's jaws are shown open prior to engagement with the rod portion of a surfboard's leash plug illustrated in a cross-sectional view.

Still another embodiment of the present invention is illustrated in FIG. 4 where like reference numerals are used for those elements that have been previously described. While this embodiment operates and functions as the previously-described embodiment, it differs in that a slot 18C is provided through the central portion of pin 18. Cooperating with slot 18C is a transverse pin 60 that is fixedly coupled to housing 12 and extends into and/or through slot 18C. The combination of slot 18C and transverse pin 60 keeps pin 18 and housing 12 coupled to one another and defines the amount of travel of pin 18. Thus, this embodiment eliminates the need for flanges 26A and 26B (FIG. 1) in terms of a travel stop. However, flanges 26A/26B may still be provided as a means of tamper resistance as previously described.

Figure 5:
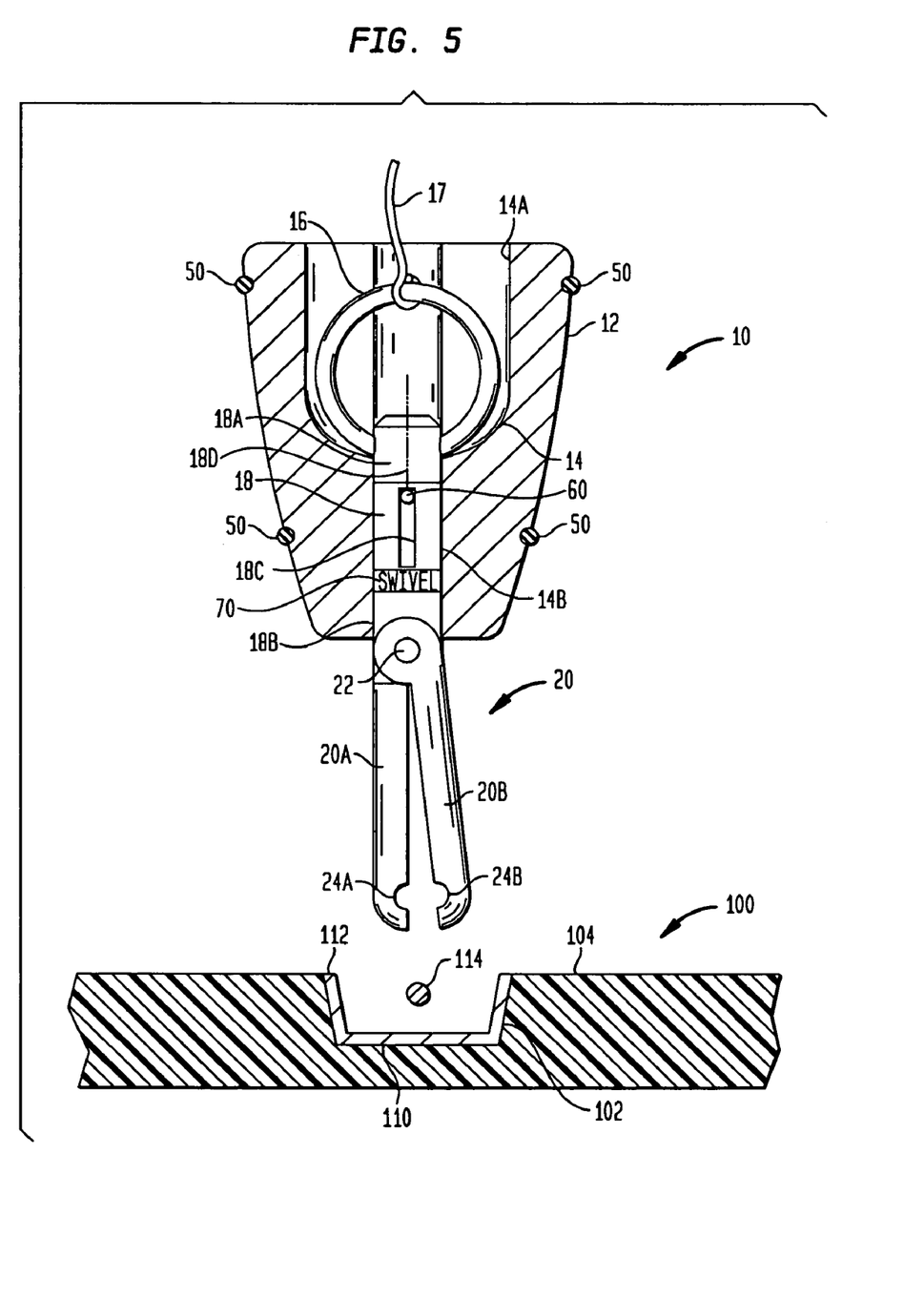
FIG. 5 is a part cross-sectional, part side view of another embodiment of a cable lock coupling according to the present invention in which a swivel is incorporated into the cable lock coupling's pin.

Yet another embodiment of the present invention is illustrated in FIG. 5 where like reference numerals are used for those elements that have been previously described. While this embodiment essentially operates and functions as the previously-described embodiment, it differs in that a swivel 70 is incorporated in pin 18. More specifically, swivel 70 is positioned in pin 18 between ends 18A and 18B such that swivel 70 remains within housing 12 at all times. Swivel 70 provides for the rotation of end 18B about the longitudinal axis 18D of pin 18 while end 18A remains rotationally fixed.

Figure 6:
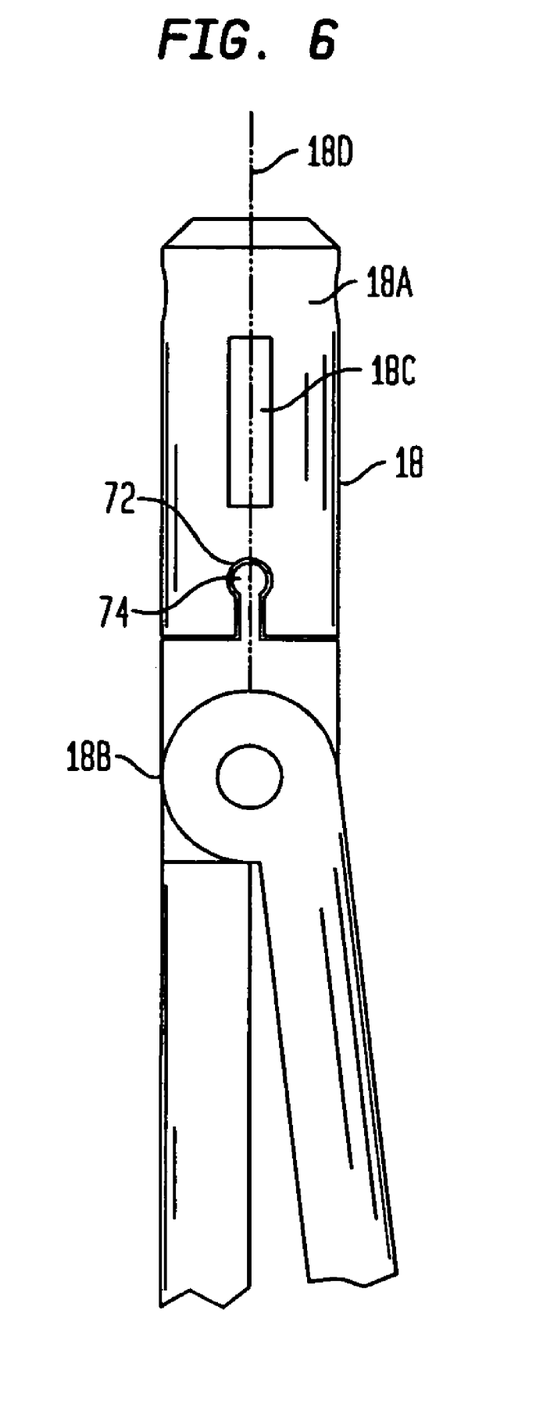
FIG. 6 is an isolated side view of a portion of a pin that incorporates one embodiment of a swivel.

In this way, once jaws 20 are locked onto a surfboard as described above, any twisting force applied to housing 12 merely results in rotation of housing 12 relative to jaws 20 owing to swivel 70. It is to be understood that the particular configuration and construction of swivel 70 is not a limitation of the present invention. However, by way of example, one embodiment of a swivel is illustrated in FIG. 6 where pin 18 is made from two pieces with a socket 72 being formed in one piece of pin 18 that includes end 18A and a ball 74 being formed in the second piece of pin 18 that includes end 18B. Ball 74 fits in socket 72 such that end 18B is free to rotate relative to end 18A.

Although the invention has been described relative to specific embodiments thereof, there are numerous variations and modifications that will be readily apparent to those skilled in the art in light of the above teachings. For example, the present invention could be used to latch onto other rod-like portions of a surfboard such as a fin box cleat that already exists or is installed in a surfboard's fin box. It is therefore to be understood that, within the scope of the appended claims, the invention may be practiced other than as specifically described.

What is claimed as new and desired to be secured by Letters Patent of the United States is:

1. A system for coupling a cable lock to a surfboard, comprising:
    a housing having a passage extending therethrough, said passage defined by a first portion and a second portion adjacent to said first portion;
    a pin having a longitudinal axis and slidably fitted within said passage, said pin having a first end and a second end wherein at least one of said first end and said second end is in said housing at all times;
    a ring coupled to said first end of said pin, said ring being sized and shaped to slidably fit only in said first portion of said passage and adapted to receive a cable therethrough when at least a portion of said ring protrudes from said housing, said second end of said pin protruding from said second portion of said passage when said ring is at least partially in said first portion of said passage such that said ring is adapted to prevent passage of the cable therethrough;
    swivel means incorporated in said pin and maintained in said housing at all times for allowing said second end of said pin to rotate (i) relative to said first end of said pin, and (ii) about said longitudinal axis; and
    jaw means coupled to said second end of said pin, said jaw means being free to open when said second end of said pin protrudes from said housing, said jaw means being forced to close when said second end of said pin is within said second portion of said passage wherein, when open, said jaw means is adapted to be disposed on either side of a rod fixably mounted within a receptacle recessed in a surfboard and wherein, when closed, said jaw means is adapted to capture the rod therebetween.

2. A system as in claim 1 wherein said jaw means comprises:
    a first jaw member fixed to said second end of said pin; and
    a second jaw member pivotally coupled to said second end of said pin.

3. A system as in claim 2 wherein said first jaw member is integral with said second end of said pin.

4. A system as in claim 1 wherein said jaw means comprises:
    a first jaw member fixed to said second end of said pin;
    a second jaw member pivotally coupled to said second end of said pin; and
    each of said first and second jaw members having opposing U- shaped portions formed therein that, when said jaw means is disposed on either side of the rod and closed such that said first and second jaw members are brought together, form a tubular passage therethrough that is adapted to encircle the rod.

5. A system as in claim 4 wherein said first jaw member is integral with said second end of said pin.

6. A system as in claim 1 further comprising, when said jaw means is closed, an annular flange coupled to and extending radially outward from said jaw means, said annular flange being diametrically larger than said second portion of said passage.

7. A system as in claim 1 further comprising cushion means disposed about at least a portion of said housing.

8. A system as in claim 1 further comprising means for coupling said pin to said housing and for permitting a fixed amount of sliding motion therebetween.

9. A system for coupling a cable lock to a surfboard, comprising:
    a housing having a passage extending therethrough, said passage defined by a first portion and a second portion adjacent to said first portion;
    a pin having a longitudinal axis and slidably fitted within said passage, said pin having a first end and a second end wherein at least one of said first end and said second end is in said housing at all times, said pin being movable between a first position and a second position wherein said second end is within said housing when said pin is in said first position and said second end protrudes from said housing when said pin is in said second position;
    a ring coupled to said first end of said pin, said ring being sized and shaped to slidably fit only in said first portion of said passage, said ring being adapted to receive a cable therethrough when said pin is in said first position and adapted to prevent receipt of the cable therethrough when said pin is in said second position;
    swivel means incorporated in said pin and maintained in said housing at all times for allowing said second end of said pin to rotate (i) relative to said first end of said pin, and (ii) about said longitudinal axis; and
    jaw means coupled to said second end of said pin, said jaw means being free to open when said pin is in said second position, said jaw means being forced to close when said pin is in said first position wherein, when open, said jaw means is adapted to be disposed on either side of a rod fixably mounted within a receptacle recessed in a surfboard and wherein, when closed, said jaw means is adapted to capture the rod therebetween.

10. A system as in claim 9 wherein said jaw means comprises:
    a first jaw member fixed to said second end of said pin; and
    a second jaw member pivotally coupled to said second end of said pin.

11. A system as in claim 10 wherein said first jaw member is integral with said second end of said pin.

12. A system as in claim 9 wherein said jaw means comprises:
    a first jaw member fixed to said second end of said pin;
    a second jaw member pivotally coupled to said second end of said pin; and
    each of said first and second jaw members having opposing U- shaped portions formed therein that, when said jaw means is disposed on either side of the rod and closed such that said first and second jaw members are brought together, form a tubular passage therethrough that is adapted to encircle the rod.

13. A system as in claim 12 wherein said first jaw member is integral with said second end of said pin.

14. A system as in claim 9 further comprising, when said jaw means is closed, an annular flange coupled to and extending radially outward from said jaw means, said annular flange being diametrically larger than said second portion of said passage.

15. A system as in claim 9 further comprising cushion means disposed about at least a portion of said housing.

16. A system as in claim 9 further comprising means for coupling said pin to said housing and for permitting sliding motion therebetween.

17. A surfboard locking system, comprising:
a housing having a passage extending therethrough, said passage defined by a first portion and a second portion adjacent to said first portion;
a pin having a longitudinal axis and slidably fitted within said passage, said pin having a first end and a second end wherein at least one of said first end and said second end is in said housing at all times;
a ring coupled to said first end of said pin, said ring being (i) sized and shaped to slidably fit only in said first portion of said passage, and (ii) positionable to at least partially protrude from said housing based on a position of said pin, wherein said second end of said pin protrudes from said second portion of said passage when said ring is at least partially in said first portion of said passage;
swivel means incorporated in said pin and maintained in said housing at all times for allowing said second end of said pin to rotate (i) relative to said first end of said pin and (ii) about said longitudinal axis;
jaw means coupled to said second end of said pin, said jaw means being free to open when said second end of said pin protrudes from said housing, said jaw means being forced to close when said second end of said pin is within said second portion of said passage wherein, when open, said jaw means is adapted to be disposed on either side of a rod fixably mounted within a receptacle recessed in a surfboard and wherein, when closed, said jaw means is adapted to capture the rod therebetween; and
a cable lock having a cable and a lock for locking two ends of said cable together, said cable passing through said ring when said ring at least partially protrudes from said housing such that said second end of said pin is positioned within said housing and maintained thereat wherein said jaw means is kept closed.

18. A surfboard locking system as in claim 17 wherein said jaw means comprises:
a first jaw member fixed to said second end of said pin; and
a second jaw member pivotally coupled to said second end of said pin.

19. A surfboard locking system as in claim 18 wherein said first jaw member is integral with said second end of said pin.

20. A surfboard locking system as in claim 17 wherein said jaw means comprises:
a first jaw member fixed to said second end of said pin;
a second jaw member pivotally coupled to said second end of said pin; and
each of said first and second jaw members having opposing U-shaped portions formed therein that, when said jaw means is disposed on either side of the rod and closed such that said first and second jaw members are brought together, form a tubular passage therethrough that is adapted to encircle the rod.

21. A surfboard locking system as in claim 20 wherein said first jaw member is integral with said second end of said pin.

22. A surfboard locking system as in claim 17 further comprising, when said jaw means is closed, an annular flange coupled to and extending radially outward from said jaw means, said annular flange being diametrically larger than said second portion of said passage.

23. A surfboard locking system as in claim 17 further comprising cushion means disposed about at least a portion of said housing.

24. A surfboard locking system as in claim 17 further comprising means for coupling said pin to said housing and for permitting a fixed amount of sliding motion therebetween.

25. A surfboard locking system, comprising:
a housing having a passage extending therethrough, said passage defined by a first portion and a second portion adjacent to said first portion;
a pin having a longitudinal axis and slidably fitted within said passage, said pin having a first end and a second end wherein at least one of said first end and said second end is in said housing at all times, said pin being movable between a first position and a second position wherein said second end is within said housing when said pin is in said first position and said second end protrudes from said housing when said pin is in said second position;
a ring coupled to said first end of said pin, said ring being sized and shaped to slidably fit only in said first portion of said passage, said ring being (i) positionable to at least partially protrude from said housing when said pin is in said first position, and (ii) positionable to be at least partially within said housing when said pin is in said second position;
swivel means incorporated in said pin and maintained in said housing at all times for allowing said second end of said pin to rotate (i) relative to said first end of said pin, and (ii) about said longitudinal axis;
jaw means coupled to said second end of said pin, said jaw means being free to open when said pin is in said second position, said jaw means being forced to close when said pin is in said first position wherein, when open, said jaw means is adapted to be disposed on either side of a rod fixably mounted within a receptacle recessed in a surfboard and wherein, when closed, said jaw means is adapted to capture the rod therebetween; and
a cable lock having a cable and a lock for locking two ends of said cable together, said cable passing through said ring when said pin is in said first position wherein said jaw means is kept closed.

26. A surfboard locking system as in claim 25 wherein said jaw means comprises:
a first jaw member fixed to said second end of said pin; and
a second jaw member pivotally coupled to said second end of said pin.

27. A surfboard locking system as in claim 26 wherein said first jaw member is integral with said second end of said pin.

28. A surfboard locking system as in claim 25 wherein said jaw means comprises:
- a first jaw member fixed to said second end of said pin;
- a second jaw member pivotally coupled to said second end of said pin; and
- each of said first and second jaw members having opposing U- shaped portions formed therein that, when said jaw means is disposed on either side of the rod and closed such that said first and second jaw members are brought together, form a tubular passage therethrough that is adapted to encircle the rod.

29. A surfboard locking system as in claim 28 wherein said first jaw member is integral with said second end of said pin.

30. A surfboard locking system as in claim 25 further comprising, when said jaw means is closed, an annular flange coupled to and extending radially outward from said jaw means, said annular flange being diametrically larger than said second portion of said passage.

31. A surfboard locking system as in claim 25 further comprising cushion means disposed about at least a portion of said housing.

32. A surfboard locking system as in claim 25 further comprising means for coupling said pin to said housing and for permitting sliding motion therebetween.

* * * * *